Oct. 14, 1969  G. W. URSCHEL ET AL  3,472,297

MACHINE FOR CUTTING MATERIALS

Filed March 6, 1967  7 Sheets-Sheet 1

INVENTORS
GERALD W. URSCHEL
BY    JOE R. URSCHEL

Charles S. Penfold
ATTORNEY

Oct. 14, 1969  G. W. URSCHEL ET AL  3,472,297
MACHINE FOR CUTTING MATERIALS
Filed March 6, 1967  7 Sheets-Sheet 5

INVENTORS
GERALD W. URSCHEL
JOE R. URSCHEL
BY
Charles S. Penfold
ATTORNEY

Oct. 14, 1969  G. W. URSCHEL ET AL  3,472,297
MACHINE FOR CUTTING MATERIALS
Filed March 6, 1967  7 Sheets-Sheet 6

INVENTORS
GERALD W. URSCHEL
JOE R. URSCHEL
BY
Charles S. Penfold
ATTORNEY

Oct. 14, 1969    G. W. URSCHEL ET AL    3,472,297
MACHINE FOR CUTTING MATERIALS
Filed March 6, 1967    7 Sheets-Sheet 7

INVENTORS
GERALD W. URSCHEL
BY    JOE R. URSCHEL
Charles A. Penfold
ATTORNEY

329
United States Patent Office 3,472,297
Patented Oct. 14, 1969

3,472,297
MACHINE FOR CUTTING MATERIALS
Gerald W. Urschel, 1614 Napoleon, and Joe R. Urschel,
202 Michigan Ave., both of Valparaiso, Ind. 46383
Filed Mar. 6, 1967, Ser. No. 620,914
Int. Cl. B26d *1/44, 7/20;* B02c *11/04*
U.S. Cl. 146—78                                                20 Claims

ABSTRACT OF THE DISCLOSURE

The subject invention is directed primarily to a combination comprising a stationary knife, a rotatable assembly provided with knives, an impeller for imparting flow of material for cutting into slices by the knife and the slices into pieces or segments by the knives, and means for correctly guiding the slices in relation to the knife and to the knives.

---

The subject invention relates generally to a machine or equipment for conditioning a product and more particularly is directed to a machine whereby a material or a product, such as a potato, may be uniformly cut into corresponding sections or pieces for use, such as French fries.

One of the important objects of the invention is to provide a machine which comprises, a rotatable knife assembly carrying a plurality of knives, a drum assembly which includes a stationary section provided with a stationary knife and a movable section which is adjustable to a fixed position with respect to the stationary section and provided with guide means, an impeller in the drum assembly which directs the product to the stationary knife and knives of the knife assembly in a manner whereby the guide means serves to guide and stabilize the product while it is being cut.

Another important object of the invention is to provide a machine of the character above referred to in which the drum assembly, stationary knife associated therewith and the rotatable knife assembly are arranged in a relatively close operative or juxtaposed relationship.

A significant object of the invention is to provide unique control means whereby the movable section of the drum and the guide means may be moved relative to one another as well as with respect to all the knives in a manner whereby the thickness of the slice cut by the stationary knife may be readily varied and the guide means will always be correctly positioned for guiding purposes. More specifically, the guide means interposed between the movable drum section and the rotatable knife assembly and opposite the stationary knife to more or less constitute a continuation of the movable section and so that the slice being cut will be caused to travel in a straight direction between the guide means and stationary knife or substantially in a tangential path to the knife assembly. In other words, the guide means is always maintained in a plane substantially parallel to the stationary knife and the guide means and knife define a longitudinal passage, the outer end of which terminates in close relation to the revolving knives of the knife assembly.

Also, an object of the invention is to provide an improved impeller structure having circumferentially spaced axially extending curved vanes or abutments which are designed and constructed to engage elongated products, such as potatoes, at longitudinally spaced locations for the purpose of stabilizing their movement during the periods they are being cut. Otherwise expressed, the impeller structure is adapted to accommodate relatively long products and stabilize their movement and successive presentation to the stationary knife.

Another important object of the invention is to provide an improved feed chute structure whereby the product is caused to travel in single file so that it will be prepositioned as it is presented to the impeller vanes. In other words, the impeller is so constructed that each vane is adapted to receive or engage a single product or potato at a time.

A further object of the invention is to provide an improved discharge chute or structure to direct the cut product to a suitable container or conveyor.

A specific but important object of the invention is to provide a machine in which different types of knife assemblies may be readily detachably mounted for use so that the machine may be utilized to obtain resultant products having different cross-sectional dimensions.

Another specific object is to provide an improved knife assembly comprising a cylinder, with means whereby the knives may be readily detachably connected thereto.

A further specific object of the invention is to provide a knife assembly in which the cutting portions of the knives thereof are disposed in predetermined angular relationships with respect to the axis of the cylinder so that the product will be freely cut without wedging between the knives and breakage of the resultant product will be substantially eliminated.

Also, an important object of the invention is to provide an organization whereby either straight or corrugated stationary knives may be utilized to produce substantially uniform slices. More specifically, the shape of the knives are made in such a way that the corrugated knife has its cutting edges lying in the same circular path an corrugations provided on the inner surface of the stationary drum section, and the cutting edge of a straight knife will be on the circular path formed by the innermost surface of the corrugations in such section so as to produce substantially perfect slices.

Another specific object of the invention is to provide such a machine with stationary curved guards adjacent the stationary section of the drum for preventing lateral discharge of slices, as distinguished from providing guards on the movable drum section.

Another object of the invention is to provide a stationary knife embodying improved principles of design and construction.

Additional objects of the invention reside in offering advantages with respect to efficiency, uniformity in the resultant product, output, maintainance, and durability.

Other objects and advantages of the invention will become apparent after the description hereinafter set forth are considered in conjunction with the drawing annexed hereto.

Figures 4, 5, 6:
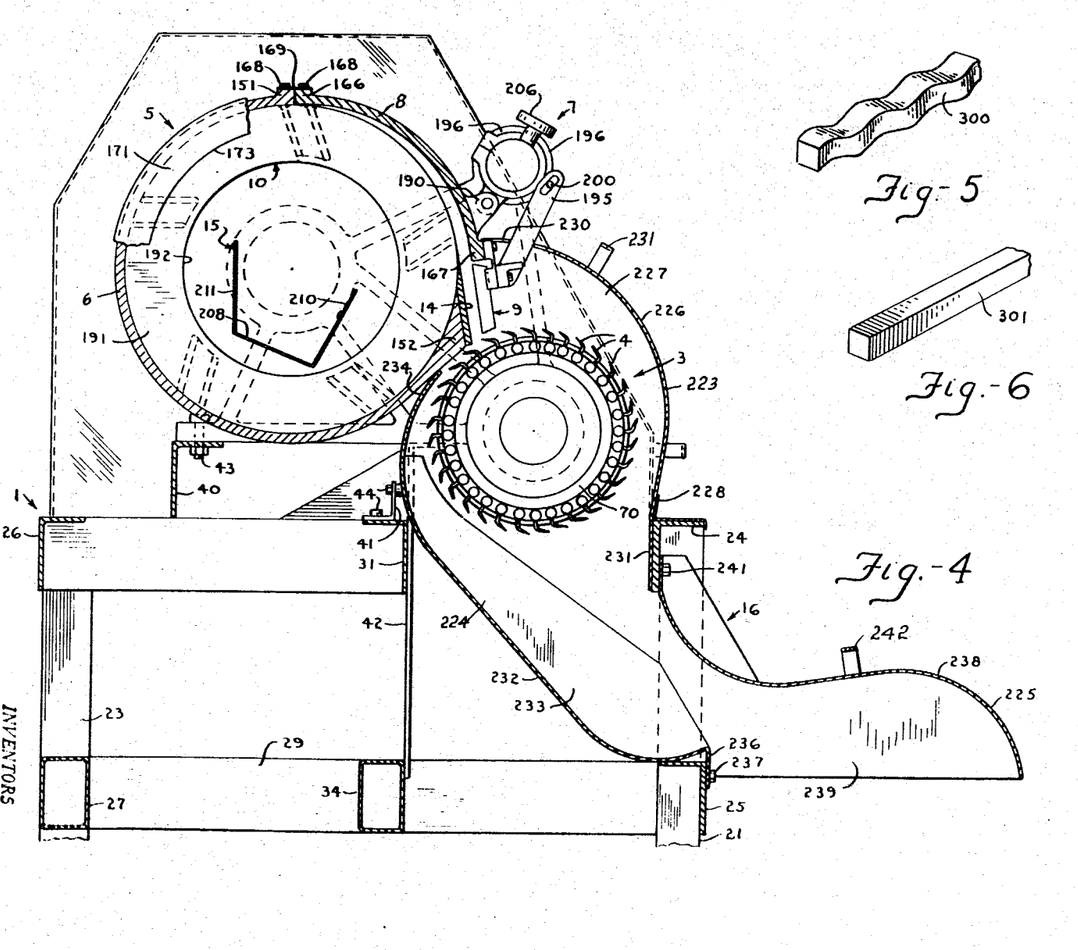
FIGURE 4 is a transverse vertical section taken through the machine illustrating the operative relationship between certain of its movable components.
FIGURES 5 and 6 respectively illustrate perspective views of different forms of a product which may be produced by utilizing the machine.

The machine as depicted in FIGURES 1, 4, 7, and 11 comprises, among other things, a frame, generally designated 1; a support, designated 2, supported on the frame; a rotatable knife assembly, designated 3, mounted on the support and provided with knives 4; a drum assembly, designated 5, mounted on the support and having a stationary section 6 provided with a stationary knife 14 and a movable section 8 adjustable to a fixed position and provided with guide means designated 9; an impeller designated 10 rotatable in the drum assembly for directing a product 11 successively to the stationary knife 14 and the knives 4 to cut it into slices 12 and segments or pieces 13; control means, designated 7, primarily mounted on the support for adjustably positioning the movable drum section 8 and guide means 9 with respect to one another and to the stationary knife 14; a feed chute structure, designated 15 for feeding the product 11 into the drum assembly for rotation by the impeller 10; a discharge structure, designated 16, for either of the resultant products shown in FIGURES 5 and 6; and a power unit 17 for rotating the knife assembly and impeller.

Figures 1, 2:
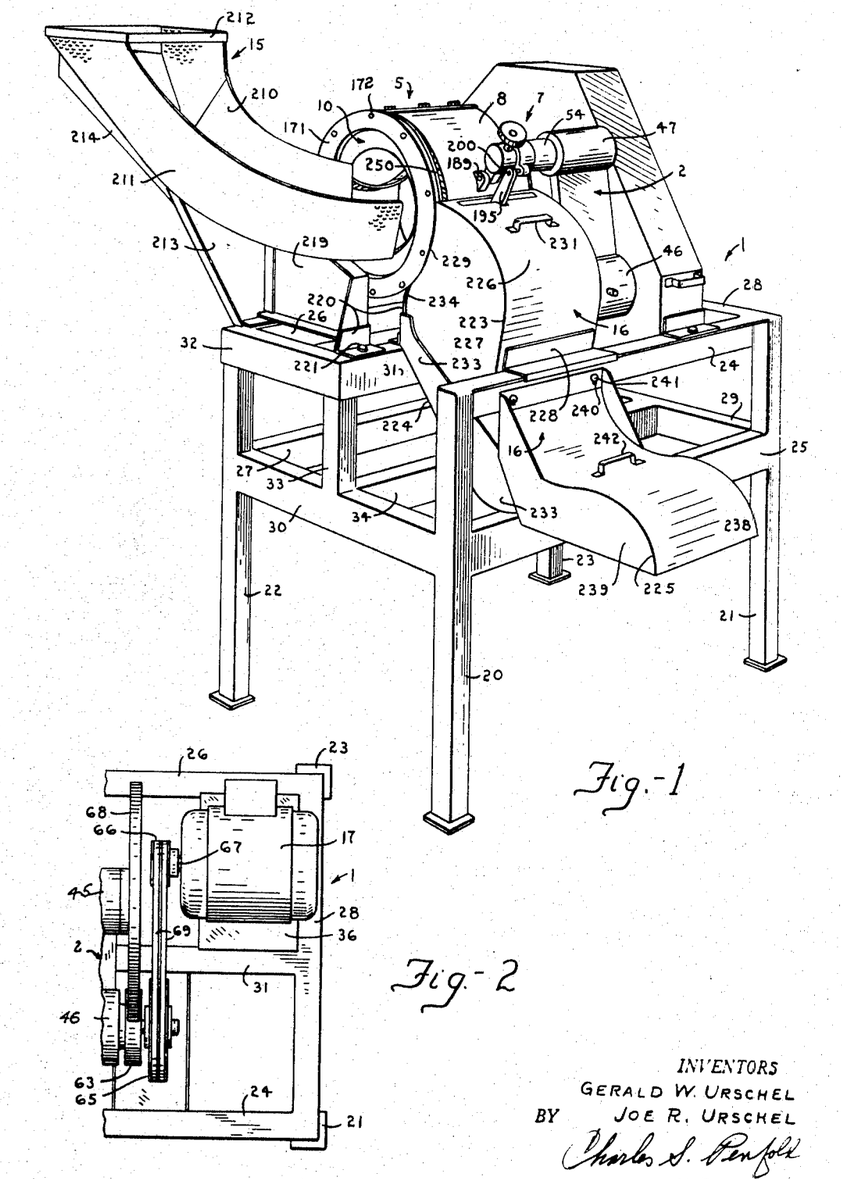
FIGURE 1 is a perspective view of the machine embodying one or more inventions.
FIGURE 2 is a partial top view of the machine illustrated in FIGURE 1, with portions thereof removed to show drive connections between certain of its components.
Figure 3:
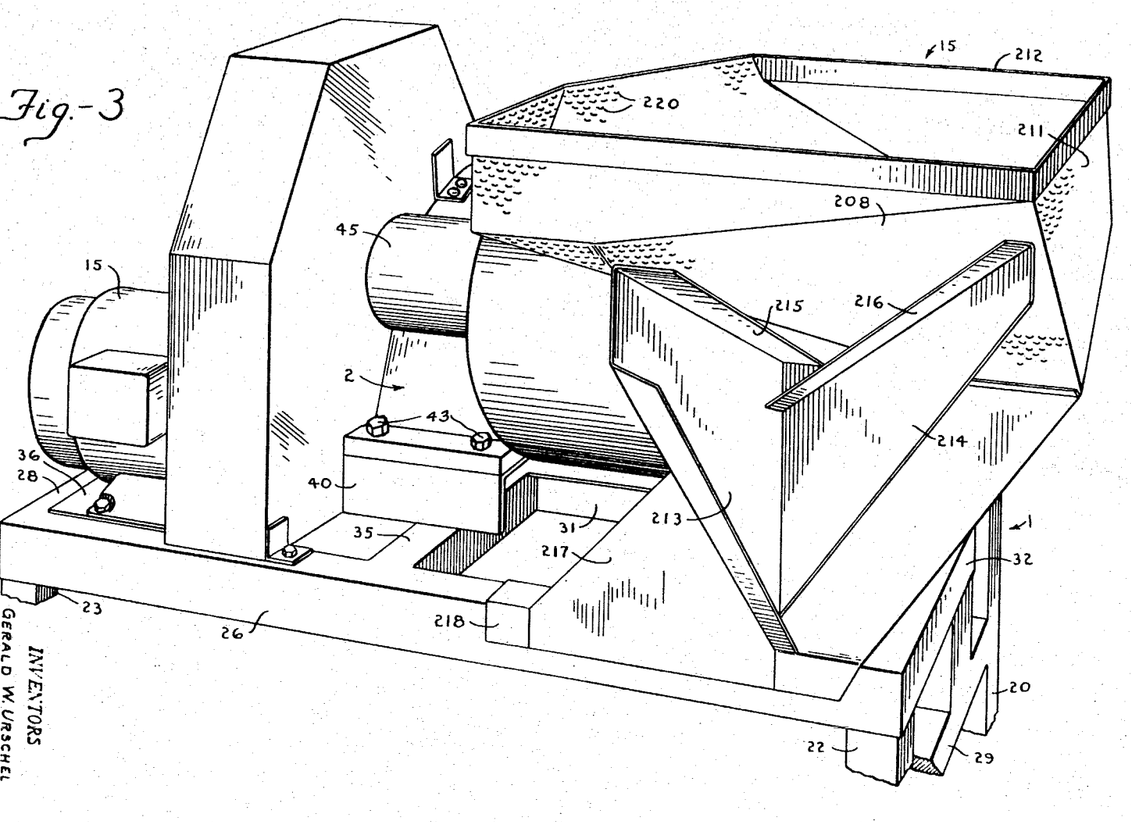
FIGURE 3 is an enlarged perspective rear elevational view of a portion of the machine depicting details with respect to mounting certain of its components.

The frame, generally designated 1, may be designed and constructed in various ways but as exemplified in FIGURES 1 through 4 it is preferably articulated, generally rectangular in shape and includes a pair of front legs 20 and 21 and a pair of rear legs 22 and 23. It also includes upper and lower front side rails 24 and 25 which join the front legs; upper and lower rear rails 26 and 27 which join the rear legs, upper and lower end rails 28 and 29 which join the legs 21 and 23 and a lower end rail 30 which joins the legs 20 and 22. The frame also includes an intermediate top rail 31 having ends connected to the upper end rail 28 and an upper short rail 32 and to a short vertical rail 33 supported on the end rail 30. Also, a lower intermediate rail 34 joins the lower end rails 29 and 30 and a top cross-rail 35 joins the upper rear rail 26 and the upper intermediate rail 31. A mounting plate 36 is secured to the rails 26 and 31 for supporting the power unit 17 in the form of an electric motor, as shown in FIGURES 2 and 3.

The support 2, as shown in FIGURES 1, 3, 4 and 7, carries the knife assembly 3, drum assembly 5 and control means 7 and will now be described. The support is preferably cast and provided with feet which are secured to the upper cross-rail 35 of the frame by a bracket 40 and bolts 43 and to an upper part of a vertical plate 42 secured to the rails 31 and 34 for firmly anchoring the support in a vertical position. The support is constructed to provide three tubular formations 45, 46, and 47. The formations 45 and 46 are relatively large and bushings 48 and 49 are respectively fixedly secured therein. A shaft 50 for the impeller 10 is journaled in the bushing 48 by spaced roller-bearing assemblies 51; a shaft 52 for the knife assembly 3 is journaled in the bushing 49 by roller-bearing assemblies 53; and an inner extremity of a shaft 54 is fixedly secured in the formation 47 for supporting the control means 7. It will be observed that the inner end of the formation 45 is provided with a relatively thick annular wall 55.

Figures 7, 8, 9, 10:
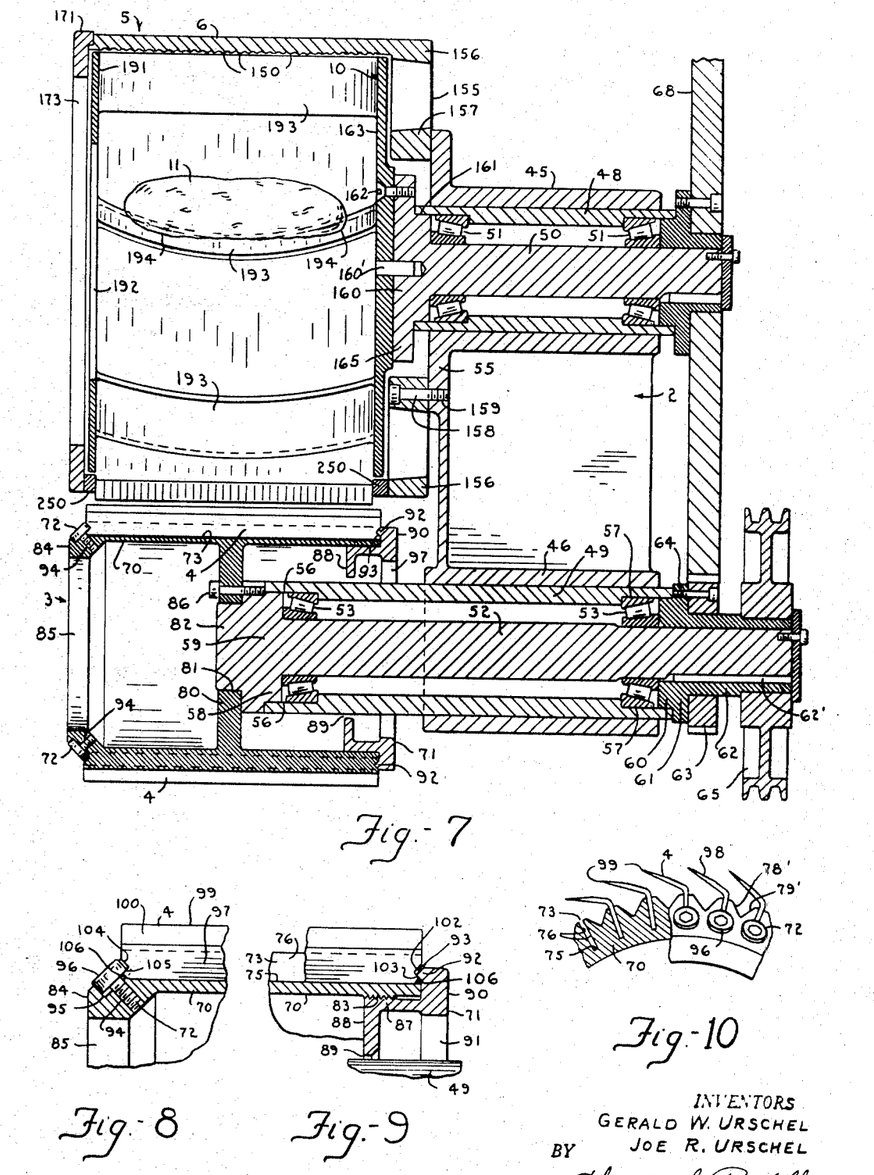
FIGURE 7 is an enlarged partial vertical section taken through an appropriate part of the machine exemplifying the operative relationship between a stationary drum carrying a stationary knife, an impeller rotatable in the drum for directing a product against the knife to slice it, and a rotatable knife assembly for cutting the slices into segments or pieces.
FIGURES 8 and 9 respectively show partial sections of the knife assembly illustrated in FIGURE 7.
FIGURE 10 is a partial end view of the knife assembly.

It will be noted that the bushing 49 for the shaft 52 extends axially an appreciable distance beyond the formation 46 and that its ends are provided with internal annular recesses 56 and 57; that the recess 56 receives a portion 58 of a bead 59 of the shaft 52 and one of the bearing assemblies 53 and that the recess 57 receives the other bearing assembly and a portion 60 of a radial flange 61 of a tubular fitting 62 which is keyed at 62' to the shaft 52. This tubular fitting carries a gear 63 connected to the flange 61 by screws 64 (one shown) and a pulley 65 which is secured to the fitting 62 for rotation therewith.

The shafts 50 and 52 may be operated in various ways but as depicted in FIGURES 2 and 7 they are driven by the electric motor 17. More specifically, the pulley 65 is connected to a pulley 66 on a driven shaft 67 of the motor by a pair of V belts 69. The gear 63 on the shaft 52 meshes with and drives a large gear 68 fixed for rotation with the impeller shaft 50.

The structure of the knife assembly 3 and mode of connecting it to the shaft 52, as exemplified in FIGURES 7, 8, and 11, will now be described. This assembly comprises a substantially hollow cylinder 70, a ring 71, and the knives 4 are secured to a cylindrical wall of the cylinder by a plurality of fasteners, preferably in the form of Allen screws 72. More specifically, the external peripheral surface of the wall is provided with a plurality of circumferentially spaced corresponding longitudinally extending substantially radial slots 73 in which either of the type of knives 4 and 74 respectively shown in FIGURES 23 and 27 may be secured. The slots 73 are substantially rectangular in cross-dimension and each is defined by a base surface 75 and a pair of parallel side surfaces 76. Portions of the wall between the slots are preferably respectively provided with longitudinally extending grooves 77, each of which is defined by a pair of planar surfaces 78 and 79 to form a right angle. It will be observed that the surface 78 is somewhat larger in area than the surface 79. It should also be noted that FIGURE 10 shows a knife assembly which substantially corresponds to the knife assembly shown in FIGURES 8 and 9 and that the cylinder thereof is provided with grooves defined by surfaces 78' and 79' which are of substantially the same area and substantially define a right angle.

The cylinder 70 is also preferably provided with an internal transverse partition 80 having an axial opening 81 therein for receiving an end portion 82 of the head 59 of the shaft 52. An inner end of the cylinder is preferably provided with internal threads 83 and an outer annular end flange or formation 84 having an opening 85 therein which affords access to the connection between the shaft and partition so that the knife assembly may be readily removed for replacement in kind or a different assembly carrying corrugated knives or knives of different sizes. A plurality of screws 86 secure the cylinder to the shaft.

The ring 71 of the knife assembly preferably includes an externally threaded cylindrical portion 87 which engages the threads 83 on the cylinder, an inset inner radial end flange 88 provided with an opening 89 and an outer radial end flange or abutment 90, provided with an opening 91, and constituting an abutment provided with an annular rib 92, defined by a pair of angularly disposed surfaces 93. It should be observed that the rib is disposed in concentric relation to the cylindrical portion 87 and that the openings 89 and 91 provide clearance for the tubular bushing 49.

The outer end flange or formation 84 of the cylinder is provided with a plurality of circumferentially spaced angularly disposed threaded apertures 94 which receive the threaded shanks of the screws 72 and with counter-recesses 95 which receive heads 96 of the screws.

Figure 26:
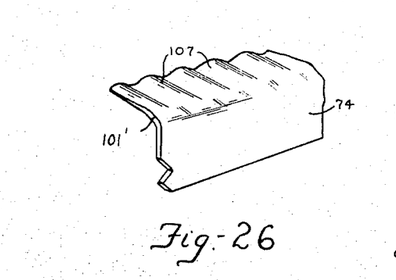
FIGURE 26 is an enlarged partial perspective view of one of a plurality of corrugated knives of the rotatable knife assembly for producing in combination with the stationary corrugated knife a product such as the one illustrated in FIGURE 5.

As alluded to above, a plurality of corresponding plain knives, like the knife 4 shown in FIGURES 8, 9, 10, and 30 may be attached to the cylinder or a plurality of corresponding corrugated knives, like the knife 74, shown in FIGURE 26 may be connected to the cylinder. Each of the knives 4 includes a longitudinally extending generally rectangular attaching side or portion 97 and an angularly disposed longitudinally extending generally rectangular side or portion 98 which is disposed at an oblique angle with respect to the side 97 and provided with a straight sharp cutting edge 99. It should be noted that one side of the portion 98 is provided with a relatively large bevelled planar surface 100; that these portions are joined by an intermediate curved portion 101; and that the opposite side of the portion 98 is provided with transversely disposed parallel flutes or grooves 400, and with bearing surfaces 401 therebetween which are disposed in a single plane.

The sides or attaching portions 97 of the knives 4 are adapted for disposition and securement in the slots 73. The inner end of each of the portions 97 is provided with a notch defined by a pair of edges 102 and 103 which receive the annular rib 92 on the abutment 90 and with a notch at its outer end, defined by a pair of edges 104 and 105 which receive the head 96 of one of the fasteners or screws 72. This structure offers a unique setup whereby the knives may be readily selectively detachably attached to the cylinder. More specifically in this respect, and assuming for example, that one of the screws 72 has been sufficiently loosened, the attaching portion 97 of a knife may be readily inserted into a slot 73 so that its inner notch will receive the rib 92 and its edge 103 will engage the lowermost surface 93 of the rib, and then be merely tightening the screw 72, a portion of its head 96 will be received in the outer notch and engage its edge 105 and thereby secure the knife in a firm or stable locked position in the slot. The engagement between the screw head and edge 105 of the knife and the engagement between the surface 93 of the rib 92 and the edge 103 of the knife serve to force or cam the knife into a fixed position against the inner or base surface 75 of a slot. It will be noted that the ends of the knives are preferably bevelled as indicated at 106 in order to provide clearances and thereby insure correct positioning and positive locking of the knives in the slots. Different knife assemblies or heads may be utilized to obtain cut segments or pieces of different cross-sectional dimensions irrespective of whether plain or corrugated knives are utilized.

Figure 23:
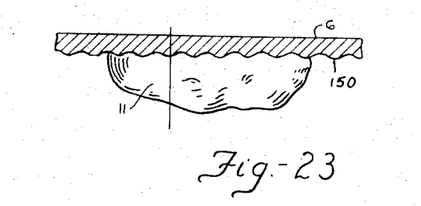
FIGURE 23 is a partial view showing a product which has been cut by a stationary corrugated knife and is engaging the inner corrugated surface of the stationary drum.
Figure 24:
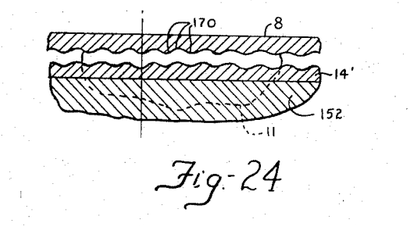
FIGURE 24 is a view, similar to FIGURE 23, showing a product being cut by a corrugated stationary knife carried by the drum.
Figure 25:
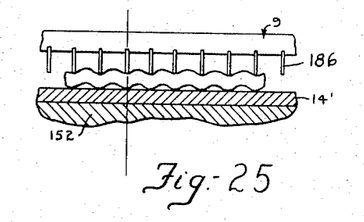
FIGURE 25 is a partial sectional view showing the operative relationship of the guide to the stationary corrugated knife.

The corrugated knives 74, except for corrugations 107 thereon, substantially correspond to the design and construction of the plain knives and are mounted on the cylinder 70 in substantially the same way. It should be noted, however, that each of the knives 74 includes an angularly disposed portion 101' which joins the side portions of each knife, the purpose of which will be described subsequently. When corrugated knives are utilized then a corrugated stationary knife 14', such as the one shown in FIGURE 15, is substituted for the stationary knife 14 so that the knives 74, in combination therewith, will produce segments or pieces like 300 shown in FIGURE 5. The various steps employed to obtain such a segment is illustrated in FIGURES 23 through 25 and will be described more in detail subsequently. When the plain stationary knife 14 is used in combination with the plain knives shown in FIGURE 30 a segment, such as the one 301 in FIGURE 6 will be produced and the steps in obtaining the same are exemplified in FIGURES 27 through 29.

Attention is directed to the fact that the offset exposed portions 98 of the knives 4 define in combination with the surfaces 78 and 79 circumferentially spaced pockets or recesses which receive the severed segments or pieces 13 as they are cut from a slice 12 of the product 13. The surfaces 79 constitute abutments or impact areas which are engaged by the segments. The relationship of the knives and grooves 77 is preferably such that the cross-sectional dimensions of the segments cut by the knives 4 will be greater than the cross-sectional dimensions of the segments produced by utilizing the knives 4 in combination with the grooves formed by the surfaces 78' and 79'. Otherwise expressed, the cylinder and knives may be designed and constructed in a manner whereby to produce segments of variable cross-sectional dimensions and these cross-sectional dimensions are determinable in conjunction with the thickness of the slice 12 being cut by the stationary knife 14.

Figures 11, 12, 13, 14, 15:
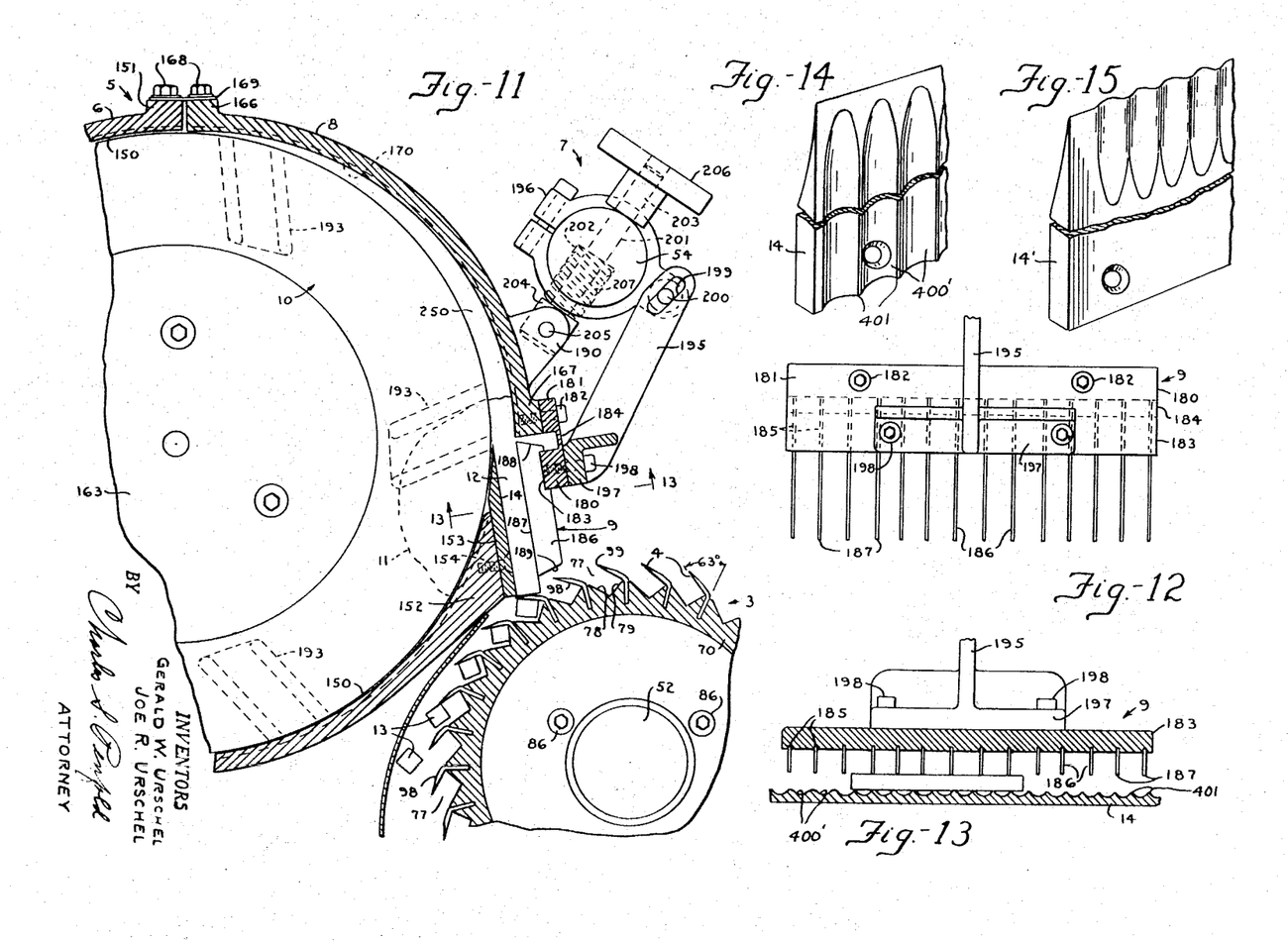
FIGURE 11 is an enlarged partial transverse vertical section of the machine illustrating structural details with respect to the relationship of the knife assembly, the impeller, and guide means, including adjutable means whereby the thickness of the product to be cut may be readily varied.
FIGURE 12 is a front elevational view of the guide means which is operatively associated with the adjustable means in a unique manner which serves to guide and stabilize the product for cutting by the stationary knife and knives of the knife assembly.
FIGURE 13 is a partial section taken substantially on line 13—13 of FIGURE 11 and depicts structural details with respect to the guide means and its relationship to the stationary knife carried by the slicing drum.
FIGURE 14 is an enlarged partial perspective view of the stationary plain knife which is utilized in FIGURES 4, 11, and 13 for cutting the product into plain slices.
FIGURE 15 is a partial perspective view of a stationary corrugated knife which may be substituted for the one shown in FIGURE 14 and utilized to produce corrugated slices.

Of further significance is the fact that the exposed portions 98 of the knives 4, as exemplified in FIGURE 11, are preferably disposed at angles of 63° with reference to a line extending from the inner portions 97. This angular disposition of the outer portions of the knives is important and serves to cut the slices at substantially right angles and thereby promotes uniformity in the resultant product by reducing to a minimum any breakage, bruising, or injury to the slices or segments.

Attention is also directed to the fact that the bevel 100 of each of the knives 4 is brought into position substantially perpendicular to the plane of each slice and that the angularly disposed portions 101' of the corrugated knives assist in ejecting the segments after being cut.

The drum assembly 5 may be designed and constructed in various ways but as illustrated in FIGURES 1, 3, 4, and 11, it preferably comprises the arcuate stationary shell or section 6 which has a circumferential extent of approximately 270° and an inner surface provided with equally spaced partially circumferentially extending corrugations 150. This section also includes an upper end flange 151 and a thicker lower edge portion 152 provided with a planar bearing surface 153 against which the stationary slicing knife 14 is detachably held by a plurality of screws 154 which extend through the knife and connect with threaded holes provided therefor in the edge portion.

The drum assembly may also be considered to include an annular spider-like end wall 155, a cylindrical wall or portion 156 and an inner annular portion 157 provided with holes through which screws 158 extend and engage threaded holes 159 provided therefor in the annular thickened portion 55 of the support 2 for fixedly securing the drum to the support. It will be observed that a head 160 of the impeller shaft 50 and a portion of the bushing 48 are disposed within the confines of the annular portion 157 of the end wall 155; that the head is provided with an annular rabbet 161 which receives an end of the bushing 48 and that screws 162 extend through an inner end wall 163 of the impeller 10 and connect with threaded apertures 164 provided therefor in a radial flange 165 of the head for detachably connecting the impeller to the shaft 50. A pin 160' extending into holes therefor in the wall 163 and flange 165 assists in axially aligning the impeller and the shaft 52.

It should be observed that the end wall 163 of the impeller and the adjacent end wall 155 are spaced apart so that the impeller may freely rotate within the confines of the drum.

The drum assembly also preferably includes the arcuate movable section 8 which has a circumferential extent of approximately 90°. This movable section has an upper end flange 166 and a lower end flange 167. The upper flange 166 is preferably connected to the upper end flange 151 of the stationary drum section by a resiliently flexible element or hinge 169 through the use of screws 168, whereby the movable section may be pivoted relative to the stationary section. The inner surface of the movable section is provided with corrugations 170 which constitute continuations of the corrugations 150 provided on the stationary section. An outer annular ring 171 is preferably detachably connected to an outer edge of the stationary section 6 by screws 172 which extend through the ring and engage threaded holes provided therefor in such edge. This ring is provided with a relatively large opening 173 which affords access to the interior of the drum.

The movable section 8 of the drum assembly is provided with the guide means 9 depicted in FIGURES 11, 12, and 13 which will now be described. This guide means may be designed and constructed in various ways but as shown includes a member 180 having a longitudinally attaching side portion 181 which is secured to the lower end flange 152 of the movable section by screws 182 and an outer longitudinally extending side portion by an intermediate restricted flexible portion or hinge 184 and provided with a plurality of corresponding transversely disposed parallel slots 185 in which outer edge portions of a plurality of planar elements 186 are fixedly secured so that opposite or inner longitudinally extending straight edge portions or surfaces 187 of the elements will provide a relatiively large rectangular area having a minimum of bearing surfaces which more or less constitute a continuation of the lower end portion of the movable drum section 8 for correctly engaging, stabilizing, and guiding the slices of the product during the cutting action. More specifically, the guide prevents the slice from tipping away from the slicing knife. If the slice guide was not present the slice would tip away from the slicing knife and cause the cross-cut knives 4 to cut improperly.

It will be observed that the upper ends of the guide elements are preferably bevelled at 188 to provide adequate clearance when the guide is moved relative to the movable drum section and at their lower ends at 189 for clearance of the knives 4. This movable section is also provided with an apertured lug 190 or ear located above its lower end flange 167.

Attention is directed to the fact that the straight edges or portions 187 of the planar elements 186 of the guide means define in combination with the bearing surfaces 401 of the stationary knife 14 a straight passageway which is substantially tangent to the drum assembly and its inner extremity is disposed in a juxtaposed relation to the outlet of the drum adjacent the lower flange 167 of the movable section to substantially constitute a continuation of such outlet and so that its outer extremity is located in a relatively close juxtaposed relation to the knives 4 of the rotatable knife assembly, as exemplified in FIGURE 11. Otherwise expressed, the passageway bridges the space between the outlet of the drum assembly and the knives of the rotatable knife assembly.

The impeller 10 may be designed and constructed in various ways but as illustrated in FIGURES 4, 7, and 11 preferably includes the inner end wall 163, above referred to, and an opposite wall 191 which is disposed in parallel relation to the wall 163 and provided with a relatively large opening 192 through which the product enters the impeller. The impeller also preferably includes a plurality of five circumferentially spaced axially extending abutments or vanes 193 which are curved throughout their lengths and disposed generally chordally with respect to the axis of the impeller.

The machine is so designed and constructed that the products are directed or fed in single file to the impeller so that each vane or abutment 193 will receive only one elongated product 11 at a time and each product will engage a vane at longitudinally spaced points 194 for the purpose of stabilizing the position of the product, thereby promoting accuracy in the cutting action to produce uniformity in the resultant product.

The unique control means 7 for the guide means 9 may be designed and constructed in various ways but as illustrated preferably comprises a lever or link 195, a split collar 196 which is adjustably mounted on the shaft 54 carried by the formation 47 on the support 2. One extremity of the lever is preferably in the form of a flanged transverse bar 197 which is detachably connected to the side portion 183 of the member 180 of the guide means by screws 198 and its opposite or upper end is provided with an elongated slot 199 which is disposed at an oblique angle with reference to the longitudinal axis of the lever. This slot receives a pin 200 carried by a lug formed on the collar 196. The shaft 54 is provided with a transverse aperture 201 which is counterbored at 202. An elongated element 203 extends through the aperture and counterbore and has an inner head 204 which is connected by a pivot 205 to the lug 190 on the movable drum section 8 and an outer threaded end which carries a manual operable nut 206. A helical spring 207 surrounds the element 203 and its inner end is disposed in the counterbore and its opposite end engages the head 204. By manipulating the nut 206 the movable drum section 8 may be moved toward or away from the stationary knife 14 for determining the thickness of the slices to be cut from the product and during this movement the guide 9 will also be moved a proportional distance for always automatically maintaining the bearing surfaces 187 of the guide in parallel relation to the knife. The guide is also moved relative to the drum section 8 and to the knives of the rotatable knife assembly.

Attention is directed to the fact that when the movable drum section 8 is moved outwardly gaps or spaces occur between the sides of this section and the stationary drum section 6. In order to substantially close such gaps a pair of arcuate members or strips 250 are detachably connected to the end wall 155 of the drum assembly and to the ring 171. These members serve to control the flow of the product to the stationary knife or otherwise serve as guides to prevent accidental release of any of the slices from the drum assembly during the cutting action.

The chute of the feed structure 15 may be designed and constructed in various ways but as exemplified in FIGURES 1, 3, 4, and 16 through 21 preferably includes a bottom wall which is inclined in two directions and has an upper extremity 208 which is generally triangular in shape and a lower extremity 209 which is of substantially uniform width. The structure also includes a curved inner side wall 210 and an outer side wall 211. The upper ends of the bottom and side walls are preferably reinforced by a generally rectangular band 212.

The chute as depicted in FIGURE 3 is preferably reinforced by structure including a pair of relatively large planar flanged trapezoidally shaped members 213 and 214. These members are angularly disposed and the flanges 215 and 216 thereon are welded to the upper extremity 208 of the bottom wall. A relatively large planar plate 217 is also connected to the extremity 208 and provided with an angle fitting 218 for restment on the rear rail 26 of the frame.

Figures 16, 17, 18, 19, 20, 21, 22:
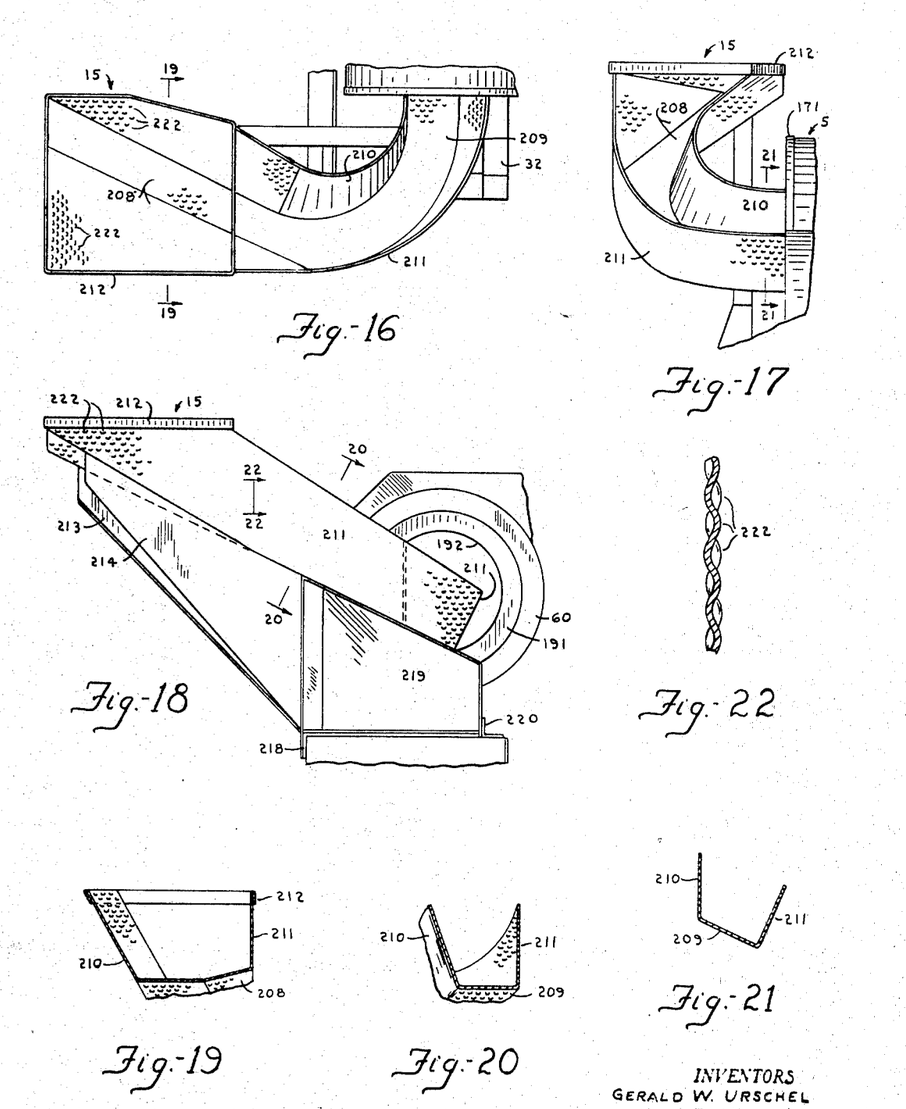
FIGURE 16 is a top view of a chute for feeding the product to the slicing drum and impeller.
FIGURE 17 is a front elevational view of the chute shown in FIGURE 16.
FIGURE 18 is an end elevational view of the chute and related structure.
FIGURE 19 is a transverse section taken substantially on line 19—19 of FIGURE 16.
FIGURE 20 is a transverse section taken substantially on line 20—20 of FIGURE 18.
FIGURE 21 is a transverse section taken substantially on line 21—21 of FIGURE 17.
FIGURE 22 is a partial transverse section taken substantially on line 22—22 of FIGURE 18.

The reinforcing structure also preferably includes a vertical support 219 which is connected to or associated with the member 213, and the lower extremity 209 of the bottom wall is provided with an angle fitting 220 through which a screw 221 may be extended for connection with the intermediate upper rail 31. With this setup the complete chute structure may be readily detachably mounted on the frame so that the lower extremity of the chute will be disposed in the opening 173 in the ring 171 of the drum assembly and in substantial registry with the entrance opening 192 in the impeller structure as shown in FIGURES 1, 16, and 17. Attention is directed to the fact that the walls of the lower extremity of the chute are preferably angularly disposed and located as depicted in FIGURES 4, 16, and 17.

Attention is directed to the fact that the bottom wall 208 and the outer side wall 211 of the chute are preferably provided throughout their entire areas with a multitude of convex anti-adhesive surfaces 222 in the form of dimples. The upper extremity of the side wall 210 is also preferably provided with such surfaces and the remainder without such surfaces as this wall is not a load bearing one to the same extent as wall 211. The arrangement is preferably such that when elongated products are dropped into the upper extremity of the chute they will fall and gradually be arranged in a single file for stabilizing their positions immediately prior to their entry into the impeller. With this setup a product, such as a potato, is fed individually to each of the abutments 193 of the impeller so that the product will engage the curved surface at the longitudinally spaced points 194, as alluded to above, for stabilizing it during its rotation by the impeller and travel against the stationary knife 4.

The discharge chute structure 16 may be designed and constructed in various ways but as depicted particularly in FIGURES 1 and 4 it is preferably comprised of three sections viz: an upper section 223, an intermediate section 224 and a lower section 225.

The upper section 223 is adapted to partially cover the rotatable knife assembly and includes a curved front wall 226, a pair of side walls 227 and a lower fitting 228 for supporting the section on the rail 24. The side walls are preferably provided with arcuate edges 229 which generally conform to and bear against the drum assembly so as to prevent lateral accidental discharge of any portions of the product during the cutting action. It will be noted that the front wall 226 includes an upper portion 230 which overlies the guide 9; a lower continuation 231 which abuts the inner side of the upper front rail 24; that it is provided with a notch through which the lever 195 extends; and with a handle 231 whereby to facilitate manipulation of this section.

The intermediate section 224 of the discharge chute assembly is generally of channel shape and includes a bottom wall 232 and a pair of side walls 233. This section receives a lower extremity of the section 223 and its bottom wall includes an upper curved portion 234 disposed between the rotatable knife assembly and drum and may engage the latter at a location whereby to confine the flow of the product through the discharge assembly. This curved portion 234 is preferably detachably connected to the intermediate upper rail 31 by a bracket 41 and screws 44. A lower portion 235 of the bottom wall has a downturned flange 236 for attachment to the lower rail 25 by screws 237. It will be noted that the lower part of the intermediate section 224 is received in an inner extremity of the lower section 225.

The lower section 225 includes an undulated top wall 238 and a pair of side walls 239. The upper portion of the top wall is preferably provided with bayonet openings 240 for detachably receiving headed studs or screws 241 provided on the rail 24. A rear side of the section 225 is adapted to engage the rail 25 of the frame. The top wall 238 is further provided with a handle 242 whereby to facilitate manipulation of the section. The discharge chute assembly serves to control the flow of the slices and/or segments to a container or onto a conveyor (not shown).

In view of the foregoing it should be manifest that improved means have been provided whereby a product, such as potatoes, may be fed singly to the impeller which stabilizes rotation of the product for cutting by the stationary knife; that the guide means 9 in combination with the stationary knife serves to provide a straight passageway between the outlet of the drum assembly and the knives of the rotatable knife assembly for stabilizing and correctly guiding the slices for cutting by the knives; and that the latter are mounted in a special way whereby to correctly cut the slices into segments.

Figure 27:
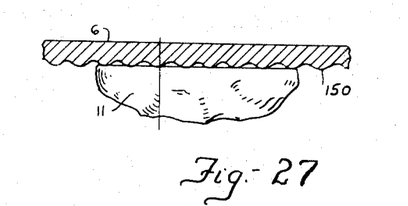
FIGURE 27 is a view, similar to FIGURE 23, showing a portion of a product which has been cut by a planar knife as depicted in FIGURE 14 riding on the crests of inner corrugated surfaces of the stationary drum.
Figure 28:
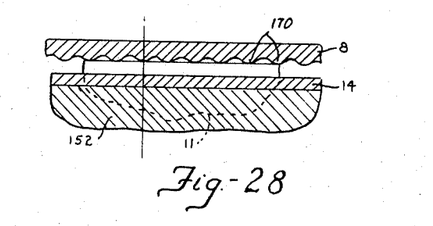
FIGURE 28 is a view, similar to FIGURE 24, showing a portion of a product being cut by the knife of FIGURE 14.
Figure 29:
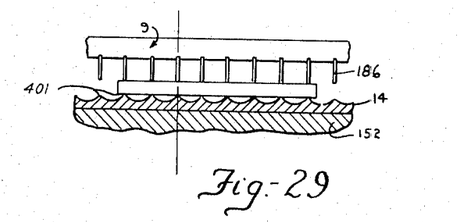
FIGURE 29 is a view, similar to FIGURE 25, showing a cut product of FIGURE 28 sliced and moving between inter surfaces of the stationary knife and the guide.
Figure 30:
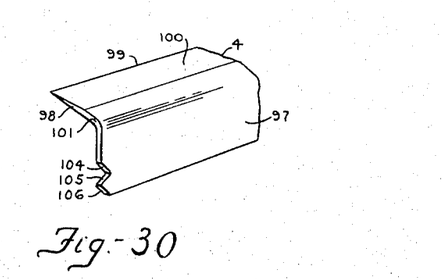
FIGURE 30 is an enlarged partial perspective view of one of the plurality of plain knives of the knife assembly.

More specifically attention is directed to FIGURES 27 through 29 which successively illustrate various steps in cutting a product when the plain stationary knife 14 and knives such as 4 are utilized. In FIGURE 27 the product is shown as engaging corrugations provided on the interior of the drum assembly; FIGURE 28, shows the product being cut and riding on the corrugations of the movable drum section; FIGURE 29, shows the product being cut into a planar slice and travelling between the members 186 of the guide and the bearing surfaces 401 of the knife.

The steps, shown in FIGURE 23 through 25, include the use of the corrugated 14' and the corrugated knives 74, and substantially correspond to the steps described above and produce the corrugated segments 300. In FIGURE 24 a corrugated slice is shown with its corrugations meeting with the corrugations on the movable drum section 8 and corrugations of the knife 14' and in FIGURE 25 with its corrugations engaging a planar portion of the knife 14' and the members 186 of the guide riding in the valleys of the corrugations, all for the purpose of guiding and stabilizing the travel of the slice between the drum and rotatable knife assembly.

Having thus described our invention, it is obvious that various modifications may be made in the same without departing from the spirit of the invention, and, therefore, we do not wish to be understood as limiting ourselves to the exact forms, construction, arrangements, and combinations of parts herein shown and described.

We claim:

1. In combination: a rotatable knife assembly, a stationary drum assembly provided with a stationary knife and a movable section defining in combination with said knife an adjacent outlet, means for rotating the product in said drum assembly against said knife for cutting it into slices for discharge through said outlet, and guide means supported for movement relative to said section and disposed substantially in parallel relation to said knife and defining in combination therewith an elongated passage costituting a continuation of said outlet for receiving the slices for direction to said rotatable knife assembly.

2. A machine for the purpose described comprising a frame, a rotatable knife assembly mounted on said frame and provided with a plurality of knives, a drum mounted on said frame and comprising a stationary section having a knife fixed thereon and a movable section having movable guide means disposed opposite said stationary knife, an impeller rotatable in said drum for directing a product against said fixed knife for cutting it into slices and against said rotatable knives for cutting the slices into pieces, and control means for adjustably positioning said movable section with respect to said fixed knife for gauging the thickness of the cut and positioning said guide means relative to said movable section for guiding the slices to the rotatable knives.

3. The machine defined in claim 2, in which said guide means is pivotally connected to said movable section, and said control means serves to pivot said movable section in a manner whereby said guide means is always maintained in a parallel position to said knife irrespective of the adjacent position of said movable section.

4. The machine defined in claim 2, in which said guide means is provided with a plurality of planar elements having straight edges which in combination with said stationary knife define a substantially straight passage having an outer end which terminates in close relation to the knives of said rotatable knife assembly.

5. A machine defined in claim 2, in which a portion of said movable drum section and a cutting edge of said fixed knife define an outlet, and said guide means includes a plurality of planar parallel elements which are disposed perpendicular to said knife and have straight edges which are disposed substantially in parallel relation to said fixed knife whereby to provide a straight passage constituting a continuation of said outlet.

6. In combination: a drum assembly comprising a stationary section provided with a stationary knife and a movable section having a portion adapted for fixation in spaced relation to said knife and defining an outlet, an impeller rotatable in said drum assembly and provided with circumferentially spaced abutment surfaces for directing a product against said knife for cutting the product into slices for passage through said outlet, means whereby said portion of said movable section may be moved relative to said stationary knife for determining the thickness of the slices, guide means responsive to the movement of said movable section, and means for automatically maintaining said guide means substantially in parallel relation to said stationary knife irrespective of the position of said movable section.

7. The combination defined in claim 6, including means interposed between portions of said movable section and said stationary section and fixedly secured to the latter serving to control the flow of the slices through said outlet.

8. Guide means for the purpose described, said guide means comprising a member provided with an attaching portion and an adjacent portion which is connected to the attaching portion for movement with respect thereto, said adjacent portion being provided with a plurality of substantially planar elements having straight edge portions disposed in substantially the same plane for guiding purposes.

9. A control means for the purpose described, said control means comprising a member adapted to be fixedly secured to a stationary support, a fitting carried by said member, an elongated element extending through said member and having an inner head end adapted for connection with a movable component and manual means at its opposite end, guide means, and a lever having ends respectively connected to said fitting and said guide means in a manner whereby the latter may be moved relative to such a component.

10. An impeller structure comprising a pair of annular planar end walls, and a plurality of circumferentially spaced axially extending abutments having extremities which are joined to said end walls for maintaining the latter in parallel relation, one of said end walls being provided with means whereby to facilitate its connection with a rotatable shaft, the other of said walls being provided with a relatively large centrally disposed opening through which a product may be conducted into the impeller structure, said abutments being curved substantially throughout their lengths so that when an elongated product is conducted through the opening the product will be caused to engage one of the abutments at longitudinally spaced locations thereon whereby to stabilize the position of the product when the impeller structure is rotated.

11. The impeller structure defined in claim 10, in which said abutments are disposed substantially in chordal positions.

12. In combination: an impeller structure, means for conducting elongated products thereto, said impeller structure comprising a plurality of walls including an end wall provided with an opening and a plurality of circumferentially spaced axially extending abutments provided with curved surfaces extending substantially throughout their lengths, said conducting means comprising walls for arranging and directing the products in single file into the impeller structure via said opening so that each surface will receive only one product at a time and engage the same at longitudinally spaced locations for stabilizing its position.

13. In combination: a stationary drum assembly provided with a stationary knife and a movable section defining in combination with said knife an adjacent outlet, means for rotating the product in said drum assembly against said knife for cutting it into slices for discharge through said outlet, and guide means supported for movement relative to said section and disposed substantially in parallel relation to said knife and defining in combination therewith an elongated passage constituting a continuation of said outlet for receiving the slices for movement therethrough.

14. In combination: a drum assembly comprising a stationary section provided with a stationary knife and a movable section adapted for fixation in spaced relation to said knife and defining an outlet, an impeller rotatable in said drum assembly and provided with circumferentially spaced abutment surfaces for directing a product against said knife for cutting the product into slices for passage through said outlet, means whereby said movable section may be moved relative to said stationary knife for determining the thickness of the slices, guide means carried by said movable section for movement with respect thereto, and means whereby said guide means may be moved relative to said movable section and substantially in parallel relation to said stationary knife.

15. The combination defined in claim 14, in which said stationary knife is elongated and substantially rectangular in shape, one side of said knife is provided with a bevel terminating in a cutting edge, and on opposite sides thereof is provided with a plurality of transversely disposed parallel recesses and bearing surfaces therebetween which are disposed in the same plane.

16. In combination: an assembly for slicing a product comprising a stationary section provided with a stationary knife and a movable section adapted for fixation in spaced relation to said knife and defining an outlet, means for directing a product against said knife for cutting the product into slices for passage through said outlet, a rotatable knife assembly carrying knives for cutting the slices into pieces disposed in relative close relationship to said outlet, means whereby said movable section may be moved relative to said stationary knife for determining the thickness of the slices, guide means interposed between said outlet and said rotatable knife assembly for guiding the slices to the latter and being movable relative to said movable section, and means for causing said guide means to move relative to said movable section and substantially in parallel relation to said stationary knife.

17. The combination defined in claim 16, in which the knives of said rotatable knife assembly are provided with corrugated cutting edges.

18. The machine defined in claim 2, in which said guide means is provided with spaced longitudinally extending edge portions which may engage planar surfaces of the slices or in the grooves of corrugated slices depending on the character of the fixed knife.

19. The combination defined in claim 12, in which certain of said walls of said conducting means are provided with a multitude of convex anti-adhesive surfaces.

20. The combination defined in claim 12, in which a plurality of relatively large planar flanged members are connected to one another and to certain of the walls of said conducting means for stabilizing the latter.

References Cited

UNITED STATES PATENTS

| 2,934,117 | 4/1960 | Urschel et al. | 146—78 |
| 3,361,171 | 2/1968 | Tiby | 146—78 |

W. GRAYDON ABERCROMBIE, Primary Examiner

U.S. Cl. X.R.

146—164